UNITED STATES PATENT OFFICE.

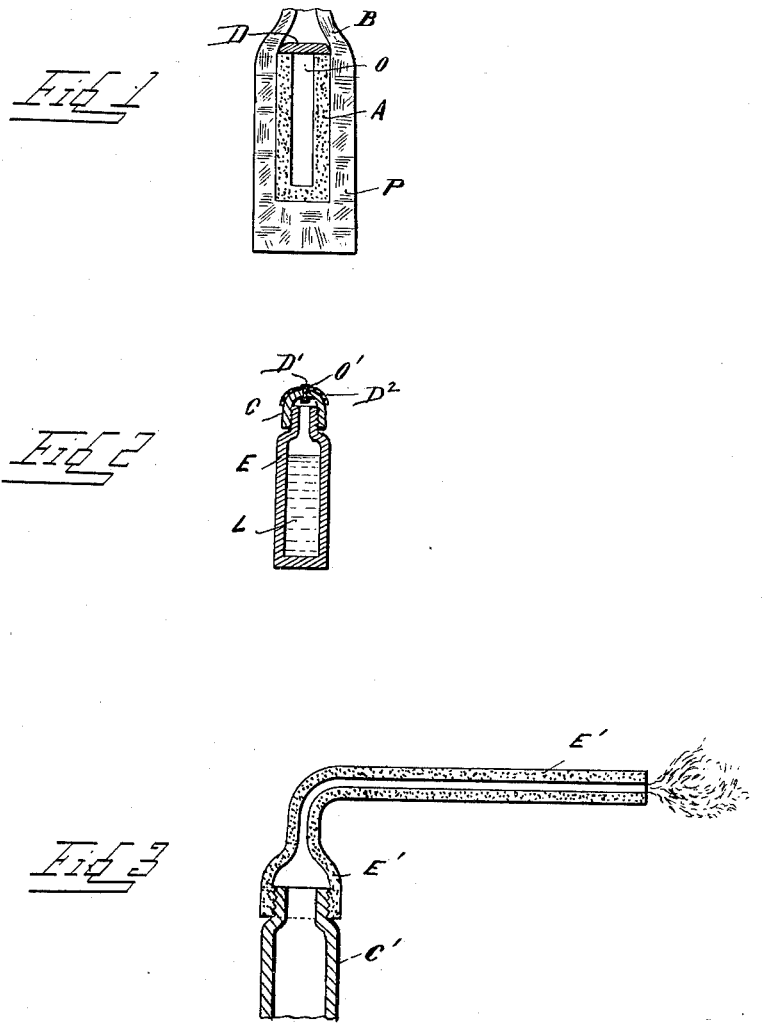

JOSÉPHINE MARIE LOUISE MESSERLI, OF PARIS, FRANCE.

FUMIGATING DEVICE.

SPECIFICATION forming part of Letters Patent No. 663,770, dated December 11, 1900.

Application filed February 20, 1899. Serial No. 706,257. (No model.)

*To all whom it may concern:*

Be it known that I, JOSÉPHINE MARIE LOUISE MESSERLI, (born Imbert,) a citizen of the Republic of France, residing at Paris, France, have invented certain new and useful Improvements in Fumigating Devices, of which the following is a specification.

My invention has relation to a device for producing gases or vapors for fumigating purposes; and it has for its object to provide a simple and inexpensive device by which gases or vapors adapted for fumigation may be produced.

In the accompanying drawings I show, in Figure 1, a vertical sectional view of a fumigating-body constructed according to my device. Fig. 2 is a similar view of a device for vaporizing corrosive liquids, the outer combustible covering being removed. Fig. 3 is a similar view of a slightly-modified vaporizer.

In carrying out my invention I may use various substances capable of evolving gas or vapor under the action of ordinary heat, such as camphor, menthol, phenol, corrosive sublimate, or other readily-volatilizable substances.

I first take a suitable quantity of the volatilizable substance—say, for instance, camphor in the form of powder—mix with it pulverized wood and clay, plaster-of-paris, or the like, and form the same into a paste by the addition of a liquid, and while in a paste form I cause the same to assume any suitable shape—as, for instance, a hollow cylinder A. (Seen in Fig. 1.)

When the latter is dry, I cover it with an incombustible varnish and close its upper aperture with wax D to prevent the gases evolved from the outer combustible mass, presently described, from acting upon the camphor, and also prevent slow evaporation of the camphor. I next take a paste or coating containing any suitable combustible material, as paper, for giving the heat required for vaporizing the camphor and apply this coating to the exterior of the cylinder, as shown at P, and the whole is allowed to dry. I then ignite the outer coating around the upper part of the cylinder, and the heat produced causes the wax to first melt, which will allow the vapors of the camphor to be quickly evolved and to escape, and at the same time the perfume contained in the combustible coating also escapes into the atmosphere.

According to my invention all gases not requiring an excess of heat can be produced and the vaporizing of salts and of corrosive and other liquids can be readily effected.

In vaporizing corrosive liquids or to introduce them into a chemical mixture for the production of gases I use crucibles E, such as leaden crucibles for sulfuric and hydrofluoric acids and the like. These crucibles, which may be of any shape and water-tight, are closed by a screw-cap C, threaded upon the neck of the crucible, said cap being provided with a perforation O', which latter may be covered by a wire-gauze $D^2$. The perforation is then hermetically closed by a fusible substance, as wax, as indicated at D', by the liquid contained in the crucible. The crucible may be lined before receiving the liquid with a thin coating of perfumed wax and be covered exteriorly, including the cap, with a similar coating of perfumed wax or varnish. The crucible is in practice to be inclosed by a combustible coating, such as indicated at P in Fig. 1, excepting the gas-outlet perforation, and the said combustible coating is ignited, thus generating heat, which causes the fusible material over the outlet to melt and allowing the evolved gases to escape.

In order to conduct the evolved gases away from the vaporizer to separate such gases from those formed by the combustion of the combustible coating, I screw a tube E' upon the threaded neck of the crucible, as seen in Fig. 3, which tube serves to conduct the gases to any desired point. Where inflammable vapors are being generated, the device would have to be inclosed in a wire-gauze sheath.

By my invention I can obtain at a low cost gases or vapors for fumigating or other purposes.

What I claim is—

The herein-described fumigating device of the character set forth, which consists of a receiver of incombustible material adapted to contain the vaporizable liquid, and having an outlet-aperture, a fusible seal for said aperture, and a coating or covering of combustible material for the receiver.

In testimony whereof I have hereunto signed my name in presence of two subscribing witnesses.

JOSÉPHINE MARIE LOUISE MESSERLI,
NÉE IMBERT.

Witnesses:
EDWARD P. MacLEAN,
JEAN BAPTISTE FELIX MARINI.